UNITED STATES PATENT OFFICE 2,404,164

ALIPHATIC OXYNITRILES

Erwin L. Carpenter, Cos Cob, Conn., assignor to American Cyanamid Company, New York, N. Y., a corporation of Maine No Drawing. Application August 6, 1943, Serial No. 497,685

1 Claim. (Cl. 260—464)

The present invention relates to aliphatic oxynitriles of the formula:

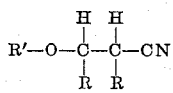

in which R' is an aliphatic group containing at least 3 carbon atoms, said R' containing at least one cyano radical, and R is chosen from the group consisting of hydrogen and alkyl.

This application is a continuation-in-part of my application Serial No. 304,165, filed November 13, 1939.

The above compounds may be prepared by reacting an acrylonitrile of the general formula:

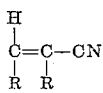

where R designates hydrogen or an alkyl, in the presence of a catalyst having an alkaline reaction, with an aliphatic polyhydric alcohol or a derivative of an aliphatic polyhydric alcohol in which one hydroxyl is replaced by a cyano radical. Thus for example, ethylene cyanohydrin and ethylene glycol react with acrylonitrile according to the following equations:

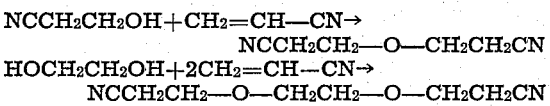

Catalysts for the reaction include for example, the oxides, hydroxides, amides and alcoholates of the alkali and alkaline earth metals, or the free alkali and alkaline earth metals themselves. The amount of catalyst necessary to promote the reaction is exceedingly small, and usually in the proportion of from .005 to 1% of the total weight of the acrylonitrile and alcohol.

While the reaction takes place in most mixtures at a temperature within the range of 30–150° C., it may be found practical to operate at somewhat lower or higher temperatures. In a reaction where it is preferable to employ temperatures lying above the boiling point of at least one of the components, it may be advantageous to carry out the reaction in a closed vessel under pressure.

The invention will be illustrated in greater detail by the following examples in which the parts are by weight.

Example 1

212 parts of acrylonitrile are slowly added with stirring to a solution of two parts of metallic sodium dissolved in 298 parts of ethylene cyanohydrin, the temperature being maintained at 40°–45° C. The reaction mixture is kept at this temperature for three hours, then allowed to stand for sixteen hours at room temperature, and neutralized with concentrated sulfuric acid. The product, $\beta,\beta'$-dicyano-diethyl ether having the formula

cannot be distilled without some decomposition, but can be readily hydrolyzed to either the corresponding acid or any desired ester by known reactions.

The $\beta,\beta'$-dicyano-diethyl ether may also be formed under similar conditions by reacting one mole of water with two moles of acrylonitrile in the presence of an alkaline catalyst. The reaction probably takes place through the intermediate formation of ethylene cyanohydrin, that is to say, one mole of water reacts with one mole of acrylonitrile to produce one mole of ethylene cyanohydrin which then reacts with another mole of acrylonitrile to produce the new ether.

Example 2

220 parts of acrylonitrile are slowly added with stirring to a solution of 0.5 part of metallic sodium dissolved in 124.8 parts of ethylene glycol, the temperature being maintained at 35°–40° C. The resulting solution is stirred for three hours at 40°–50° C. It is then cooled to room temperature, allowed to stand for sixteen hours, neutralized with concentrated sulfuric acid, and distilled. The product $\beta,\beta'$-dicyanodiethyl ether of ethylene glycol, having the formula

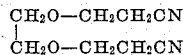

boils at 138° C. under 1 mm. pressure with some decomposition.

In a similar manner other aliphatic polyhydric alcohols such as, for example, diethylene glycol, triethylene glycol, propylene glycol, trimethylene glycol, glycerol and the like may be reacted with acrylonitrile, $\beta$-methacrylonitrile, $\alpha$-methacrylonitrile, $\alpha$-ethacrylonitrile and other alpha, beta alkyl acrylonitriles to produce the corresponding aliphatic oxynitriles.

The products herein described are of particular utility as intermediates for the preparation of wetting agents, anti-freezing agents, solvents, plasticizers, insecticides, and agents useful in the textile field. These compounds have in themselves possible uses as solvents, plasticizers, and sources of diamines and dibasic acids for resin manufacture.

While the invention has been described with particular reference to specific embodiments, it is to be understood that it is not to be limited thereto but is to be construed broadly and restricted solely by the scope of the appended claim.

I claim:

$\beta,\beta'$-dicyano-diethyl ether of ethylene glycol.

ERWIN L. CARPENTER.